US007085266B2

(12) United States Patent
Calvignac et al.

(10) Patent No.: US 7,085,266 B2
(45) Date of Patent: Aug. 1, 2006

(54) APPARATUS, METHOD AND LIMITED SET OF MESSAGES TO TRANSMIT DATA BETWEEN COMPONENTS OF A NETWORK PROCESSOR

(75) Inventors: Jean Louis Calvignac, Cary, NC (US); Marco Heddes, Lawrence, MA (US); Joseph Franklin Logan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 954 days.

(21) Appl. No.: 10/095,792

(22) Filed: Mar. 12, 2002

(65) Prior Publication Data
US 2002/0191642 A1 Dec. 19, 2002

Related U.S. Application Data

(60) Provisional application No. 60/277,589, filed on Mar. 21, 2001.

(51) Int. Cl.
H04L 12/50 (2006.01)

(52) U.S. Cl. .................................. 370/360

(58) Field of Classification Search ............ 370/351, 370/357, 359, 360, 389, 401, 466, 467, 474
See application file for complete search history.

(56) References Cited

U.S. PATENT DOCUMENTS

| | | | | |
|---|---|---|---|---|
| 5,222,085 A * | 6/1993 | Newman | ..................... | 370/422 |
| 5,557,609 A * | 9/1996 | Shobatake et al. | ..... | 370/395.71 |
| 5,740,172 A * | 4/1998 | Kang | ......................... | 370/392 |
| 5,745,781 A | 4/1998 | Ekanadham et al. | ... | 395/800.29 |
| 5,802,055 A * | 9/1998 | Krein et al. | ................. | 370/402 |
| 5,915,092 A * | 6/1999 | Morita et al. | ............... | 709/213 |
| 5,917,828 A * | 6/1999 | Thompson | ................... | 370/474 |
| 5,930,252 A | 7/1999 | Aaker et al. | ................ | 370/395 |
| 5,987,554 A * | 11/1999 | Liu et al. | .................... | 710/310 |
| 6,018,782 A * | 1/2000 | Hartmann | .................... | 710/310 |
| 6,058,434 A | 5/2000 | Wilt et al. | .................. | 709/300 |
| 6,078,733 A | 6/2000 | Osborne | ................... | 395/200.8 |
| 6,081,834 A | 6/2000 | Brandt et al. | ............... | 709/213 |
| 6,104,696 A * | 8/2000 | Kadambi et al. | ........... | 370/218 |
| 6,122,670 A | 9/2000 | Bennett et al. | ............. | 709/236 |
| 6,278,708 B1 * | 8/2001 | Von Hammerstein et al. | .......................... | 370/389 |
| 6,321,280 B1 * | 11/2001 | Koike et al. | .................. | 710/52 |
| 6,505,267 B1 * | 1/2003 | Luke et al. | ................. | 710/315 |
| 6,742,063 B1 * | 5/2004 | Hellum et al. | ................ | 710/66 |

FOREIGN PATENT DOCUMENTS

| | | |
|---|---|---|
| WO | 01/16682 A1 | 3/2001 |
| WO | 01/16779 A1 | 3/2001 |

OTHER PUBLICATIONS

J. L. Calvignac, et al., Pending U.S. Appl. No. 10/016,800, filed Dec. 10, 2001, entitled "Chip to Chip Interface for Interconnecting Chips".

(Continued)

*Primary Examiner*—Dmitry Levitan
(74) *Attorney, Agent, or Firm*—Joscelyn G. Cockburn

(57) ABSTRACT

An interface to interconnect chips in a multi-chip system includes a limited set of messages and circuit arrangements to generate the limited set of messages. The chips can be configured in different operational modes which dictates what portion of a frame is to be transmitted between selected chips of the system.

33 Claims, 10 Drawing Sheets

OTHER PUBLICATIONS

J. J. Allen, Jr. et al., Pending U.S. Appl. No. 09/384,747, filed Aug. 27, 1999, entitled "Network Switch Using Network Processor and Methods".

J. L. Calvignac et al., Pending U.S. Appl. No., entitled "Apparatus, Method and Limited Set of Messages to Transmit Data Between Scheduler and a Network Processor".

* cited by examiner

FIG. 3A

Dispatch.request Message

| Word | Bits 31-24 | 23-16 | 15-10 | 9-0 |
|---|---|---|---|---|
| 0 | Message Type = Dispatch.request | Reserved | Credits | Input Queue # |

FIG. 3B

Dispatch.response Message

| Word | Bits 31-24 | 23-16 | 15-13 | 12-10 | 9-0 |
|---|---|---|---|---|---|
| 0 | Message Type = Dispatch.response | Correlator | Control Length | Segment Control | Control Information |
| ... | ... | | | | |
| x | Control Information | | | | |
| y | Frame Data | | | | |
| ... | ... | | | | |
| z | Frame Data | | | | |

FIG. 3C

DispatchMore.response Message

| Word | Bits 31-24 | 23-16 | 15-13 | 12-10 | 9-0 |
|---|---|---|---|---|---|
| 0 | Message Type = DispatchMore.response | Correlator | Reserved | Segment Control | Reserved |
| y | Frame Data | | | | |
| ... | ... | | | | |
| z | Frame Data | | | | |

FIG. 3D

Enqueue.request Message

| Word | Bits 31-24 | 23-16 | 15-10 | 9-8 | 7-0 |
|---|---|---|---|---|---|
| 0 | Message Type = Enqueue.resquest | Correlator | Control Length | Segment Control | Control Information |
| ... | ... | | | | |
| v | Control Information | | | | |
| w | Frame Alteration Commands (optional) | | | | |
| | ... | | | | |
| x | Frame Alteration Commands (optional) | | | | |
| y | Frame Data (optional) | | | | |
| ... | ... | | | | |
| z | Frame Data (optional) | | | | |

FIG. 3E

Enqueue.response Message

| Word | Bits 31-16 | 15-1 | 0 |
|---|---|---|---|
| 0 | Message Type = Enqueue.response / Correlator | Reserved | Counter Action |

FIG. 3F

EnqueueMore.request Message

| Word | Bits 31-16 | 15-10 | 9-8 | 7-0 |
|---|---|---|---|---|
| 0 | Message Type = EnqueueMore.resquest / Correlator | Reserved | Segment Control | Reserved |
| y | Frame Data (optional) | | | |
| ... | ... | | | |
| z | Frame Data (optional) | | | |

FIG. 3G

EnqueueMore.response Message

| Word | Bits | | |
|---|---|---|---|
| | 31 30 29 28 27 26 25 24 23 22 21 20 19 18 17 16 | 15 14 13 12 11 10 | 9 8 7 6 5 4 3 2 1 0 |
| 0 | Message Type = EnqueueMore.response | Correlator | Reserved |

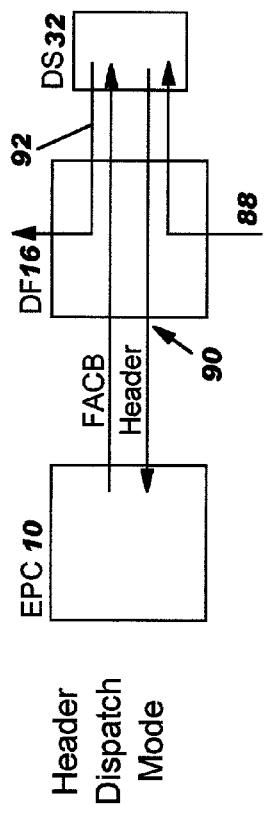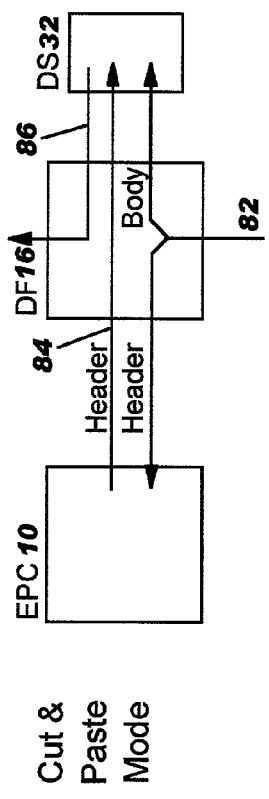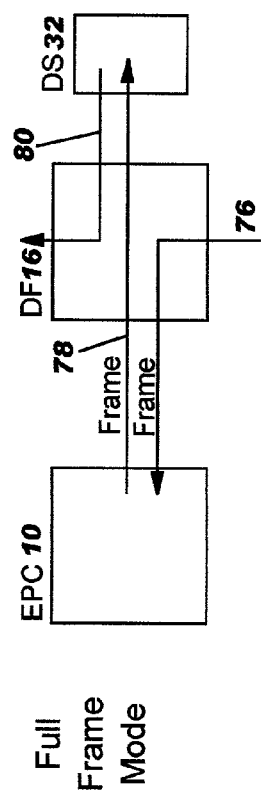

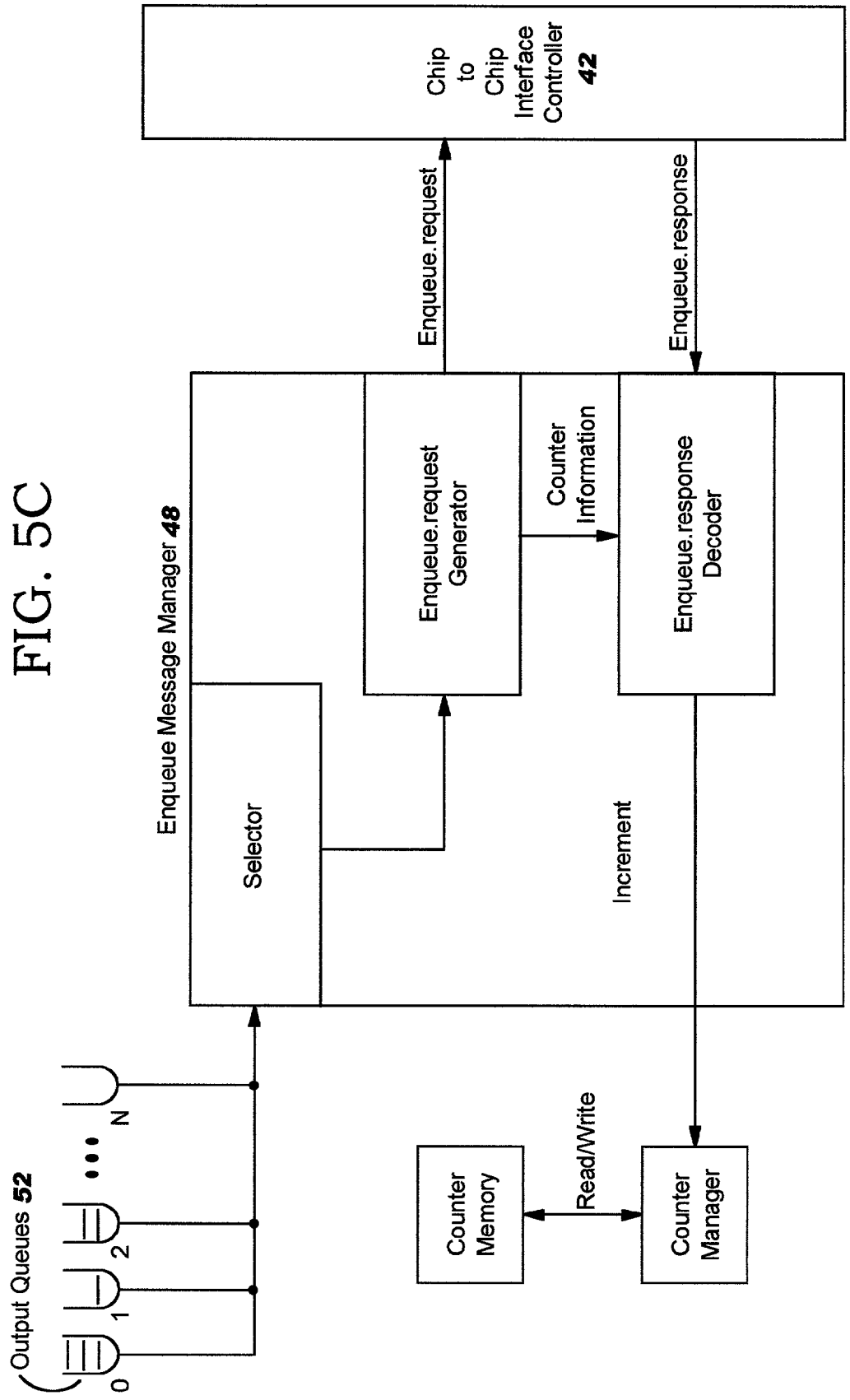

APPARATUS, METHOD AND LIMITED SET OF MESSAGES TO TRANSMIT DATA BETWEEN COMPONENTS OF A NETWORK PROCESSOR

The present application claims priority of the Provisional Application Ser. No. 60/277,589, filed Mar. 21, 2001.

CROSS-REFERENCE TO RELATED PATENT APPLICATIONS

The present invention relates to the following Patent Applications:

Patent application Ser. No. 10/095,844 which is co-assigned to the assignee of the present invention and is incorporated herein by reference;

Patent application Ser. No. 10/016,800 (RAL920000126US1) which is co-assigned to the assignee of the present invention and is incorporated herein by reference;

Patent application Ser. No. 09/384,747 which is co-assigned to the assignee of the present invention and is incorporated herein by reference.

BACKGROUND OF THE INVENTION a) Field of the Invention

The present invention relates to high speed communications systems in general and in particular to devices termed Network Processors used in said communications systems.

b) Prior Art

The use of Network Processors as essential building blocks in communications systems and devices has been on the increase and is expected to continue. It is believed the Network Processor will be as valuable to communications devices as the processor is to the personal computer. As with the processor used in the personal computer, core network functions will be designed into the Network Processor. As a consequence the designer needs only to select a Network Processor with desired characteristics, such as speed, and not be concerned about designing core network functions such as packet routing, classification policing, etc.

Broadly speaking, Network Processors may be divided into two groups, namely: single chip devices and multiple chip devices. With the single chip devices, all the functional components of the Network Processor are fabricated on a single substrate, hence the name single chip. With the multiple chip device the functional components are fabricated on more than one chip, hence the name multiple chips. The present invention primarily relates to the multiple chips type of Network Processor and the single chip type will not be discussed further.

In the multiple chips type of Network Processors the functional components area provided on multiple chips. Proper and effective interconnections of the chips are necessary if the Network Processor is going to function satisfactorily. Proper and effective interconnections relates not only to the hardware, such as busses, used to interconnect the chips but also the protocol that is used to transmit information on the busses or other interconnecting hardware. The interconnection of units termed nodes are well known in the prior art communications technology. The nodes are physically interconnected by some type of communications medium and transmission on the medium is controlled by some type of communications protocol, such as the TCP/IP etc. These protocols are so well known that further discussions are not warranted. Suffice it to say that these well known protocols are effective to interconnect nodes but may not be as effective to interconnect functional components of a system and especially to interconnect functional components of a Network Processor partioned according to the teachings of the present invention set forth herein.

As a consequence there is a need to provide an interface (messages and protocol) to communicate between functional components of a Network Processor partitioned as set forth herein.

SUMMARY OF THE INVENTION

The present invention provides an effective interface (messages and protocol) that couples the Embedded Processor Complex (EPC) to the Data Flow ASIC (Application Specific Integrated Circuit). Whereas the EPC is generic the Data Flow ASIC tends to be specific to particular networks.

The interface includes two busses. One of the two busses transmits information from the EPC to the Data Flow ASIC whereas the other bus transmits from the Data Flow ASIC to the EPC.

Information is exchanged between the EPC and Data Flow ASIC using a limited message set which includes Dispatch.request message, Dispatch.response message, Enqueue.request message, Enqueue.response message, Picocode.request message and Picocode.response message.

The pair of Dispatch messages are used to move frames received by the Data Flow Chip to the EPC for processing. When processing is completed, the pair of enqueue messages move data from the EPC to the port queues of the Data Flow ASIC (Application Specific Integrated Circuit). The pair of Picocode messages provides a mechanism for the Data Protocol Processor Units (DPPU) to issue commands to the Data Flow ASIC. The commands may include frame editing, buffer lease, buffer chaining, Register R/W etc.

The volume of data exchanged between the EPC and Data Flow ASIC is controlled by the operational mode of the Data Flow ASIC which can operate in one of three modes, namely: Full Frame Mode, Cut and Paste Mode, and Header Dispatch Mode.

In the full frame mode the Data Flow ASIC returns to the EPC full frames in the Dispatch.response message which is generated and forwarded by the Data Flow ASIC to the EPC.

In the Cut and Paste Mode only the header of the frame is sent to the EPC in the Dispatch.response message. The body of the frame is stored in the data store associated with the Data Flow ASIC and is rejoined (paste) to the header when the header is returned via the Enqueue.request message.

In the Header Dispatch Mode, the header of the frame is forwarded to the EPC and the entire frame is stored in data store. The EPC returns a Frame Alteration Control Block (FACB) with instructions to be used by the Data Flow ASIC or the data flow memory controller to alter the frame.

By providing the Limited Message Set and the mode adjustment feature of the Data Flow ASIC an effective interface is proved to communicate between the EPC and the Data Flow ASIC.

BRIEF DESCRIPTION OF THE DRAWINGS

FIGS. 3A–3G show the format for each of the Data Flow messages.

FIGS. 4A–4C show graphical representations for the different modes of operations according to the teachings of the present invention.

FIG. 5C shows a block diagram of the enqueue message manager.

DETAILED DESCRIPTION OF THE PREFERRED EMBODIMENT

Figure 1:
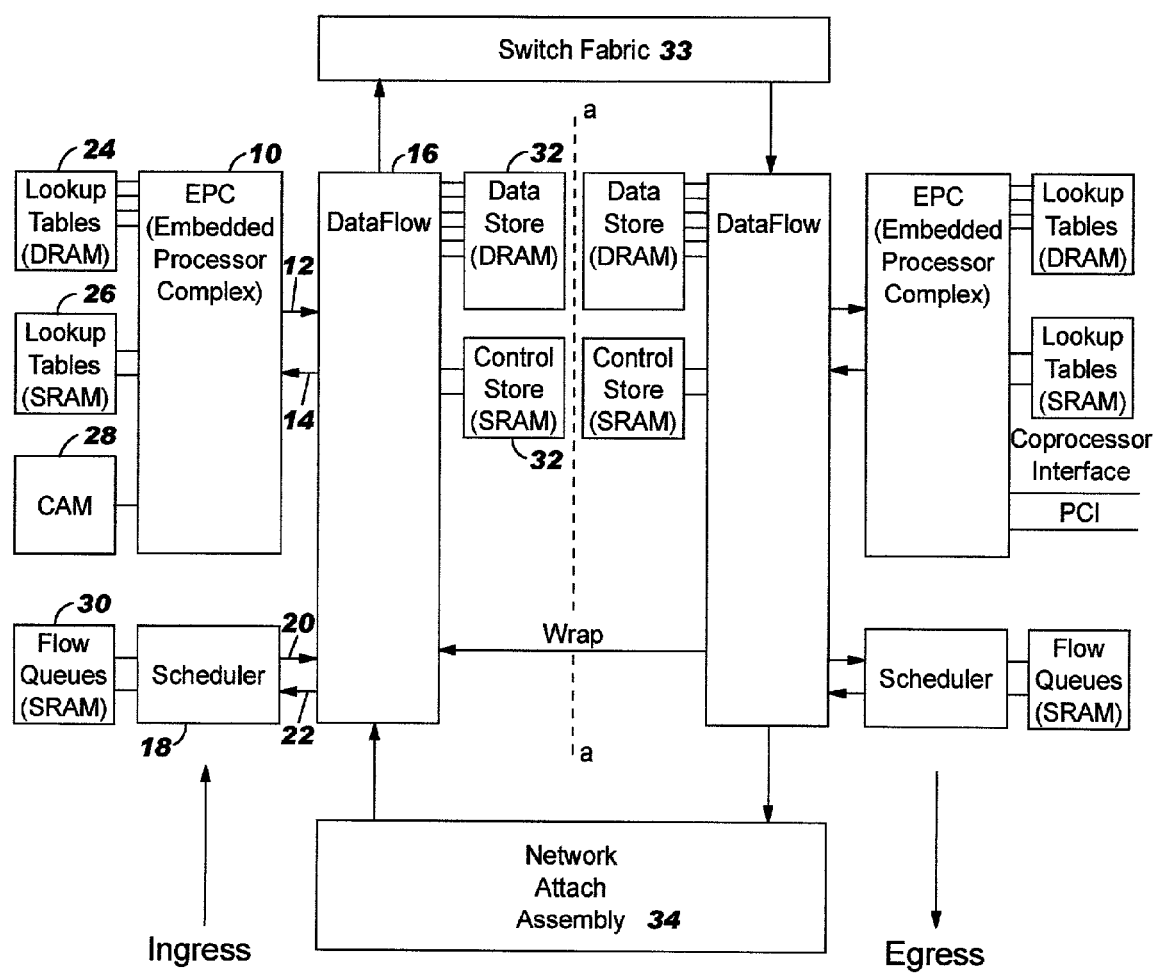
FIG. 1 shows a block diagram of a multi-chip Network Processor.

FIG. 1 shows a set of components which can be used to fabricate a multi-chip Network Processor. The components can be connected in any way the designer chooses. Usually, the interconnection is dictated by the throughput desired by the designer. For example, if a high speed (10 Gbps or greater) Network Processor is required, the designer would probably use all the components, set forth in FIG. 1, which include Embedded Processor Complex (EPC) chip 10 coupled by busses 12 and 14 to Data Flow Chip 16. A scheduler 18 which is optional can be coupled by busses 20 and 22 to the Data Flow Chip 16. Storage modules 24, 26 and 28 are coupled to the EPC chip 10. The storage module 24 can be a DRAM which stores the lookup tables used in routing or modifying frames. The storage module 26 can be an SRAM which also stores lookup tables. The CAM 28 is optional and can be used for several purposes including table lookup. Storage modules 30, SRAM, is connected to the scheduler if used and stores flow queues. Storage module 32, a DRAM, is coupled to the Data Flow Chip 16 and is used for storing data. Likewise, storage module 32, SRAM, is connected to the Data Flow Chip 16 and stores control information.

Still referring to FIG. 1, the EPC chip 10, the Data Flow Chip 16 and the Scheduler 18 form the Ingress side of the Network Processor and is replicated to be symmetrical about imaginary axis AA to form the Egress side of the Network Processor. Because Ingress side and Egress side of the Network Processor are symmetrical and identical, description of the component in one side is intended to cover like component in the other side. Therefore, only components in the Ingress side will be described, it being understood that these descriptions are applicable to like components on the Egress side of the Network Processor. A Switch Fabric 33 couples the Ingress side to the Egress side. The direction of data flow within the Network Processor is indicated by the respective arrows. A network attachment sub-assembly 34 which could be a POS framer or ethernet MAC couples the Ingress side and Egress side to the communications network (not shown). The throughput from ports of the POS framer can be 1×OC-192c, 4×OC-48c or 16×OC-12c. For the ethernet MAC one can attach a 10 gigabit ethernet port and 10×1 gigabit ports. It should be noted that the speed of the port described above are exemplary and other ports with different speeds can be added without deviating from the teachings of the present invention. It should also be noted that for a Network Processor in which the throughput is within the three to nine gigabit range only one half of the symmetrical structure shown in FIG. 1 is required. In this configuration the Ingress and Egress sides would be implemented in the selected half of the structure.

Network Processors perform many functions that are common to a wide variety of applications such as classification, table searching, frame alteration, and statistic gathering. On the other hand other functions provided by the Network Processor tend to be very specific to a particular environment such as I/O interfaces, data formats, congestion control algorithms and data buffering requirements. Because of these differences it is very difficult, if not impossible, to design a fully integrated Network Processor component that is optimized for use in all applications. This problem is addressed by placing all the common functions of the Network Processor in the EPC chip and the specific function in an ASIC (Application Specific Integrated Circuit) chip hereinafter called the Data Flow Chip. The EPC plus ASIC architecture is a powerful approach to solve the problem. In addition to splitting the function into the EPC and the Data Flow Chip an appropriate interface is required to connect the EPC chip to the Data Flow Chip. The benefits derived from this dichotomy permits a common EPC chip and software to be reused in many environments while preserving the ability to optimize a solution through supporting ASIC components.

In this EPC plus ASIC technology the EPC executes the software responsible for forwarding network traffic. It includes hardware assist functions for performing common operations like table searches and frame alterations, etc. The EPC includes multiple dyadic protocol processor units (DPPU) which operate in parallel to process network traffic. Each DPPU contains two picocode engines. Each picocode engine supports two threads. Other components of the EPC necessary for understanding the present invention will be described hereinafter. The Data Flow Chip 16 is an ASIC which serves as a primary data path for transmitting and receiving network traffic. It provides an interface to a large data store memory for buffering traffic as it flows through the Network Processor subsystem. It dispatches frames, or frame headers, to the Network Processor for processing and responds to requests from the EPC to forward frames to their target destination. The scheduler is optional if added enhances the quality of service (QoS) function provided by the Network Processor subsystem. It permits many thousands of traffic flows to be individually scheduled for their assigned quality of service level.

Figure 2:
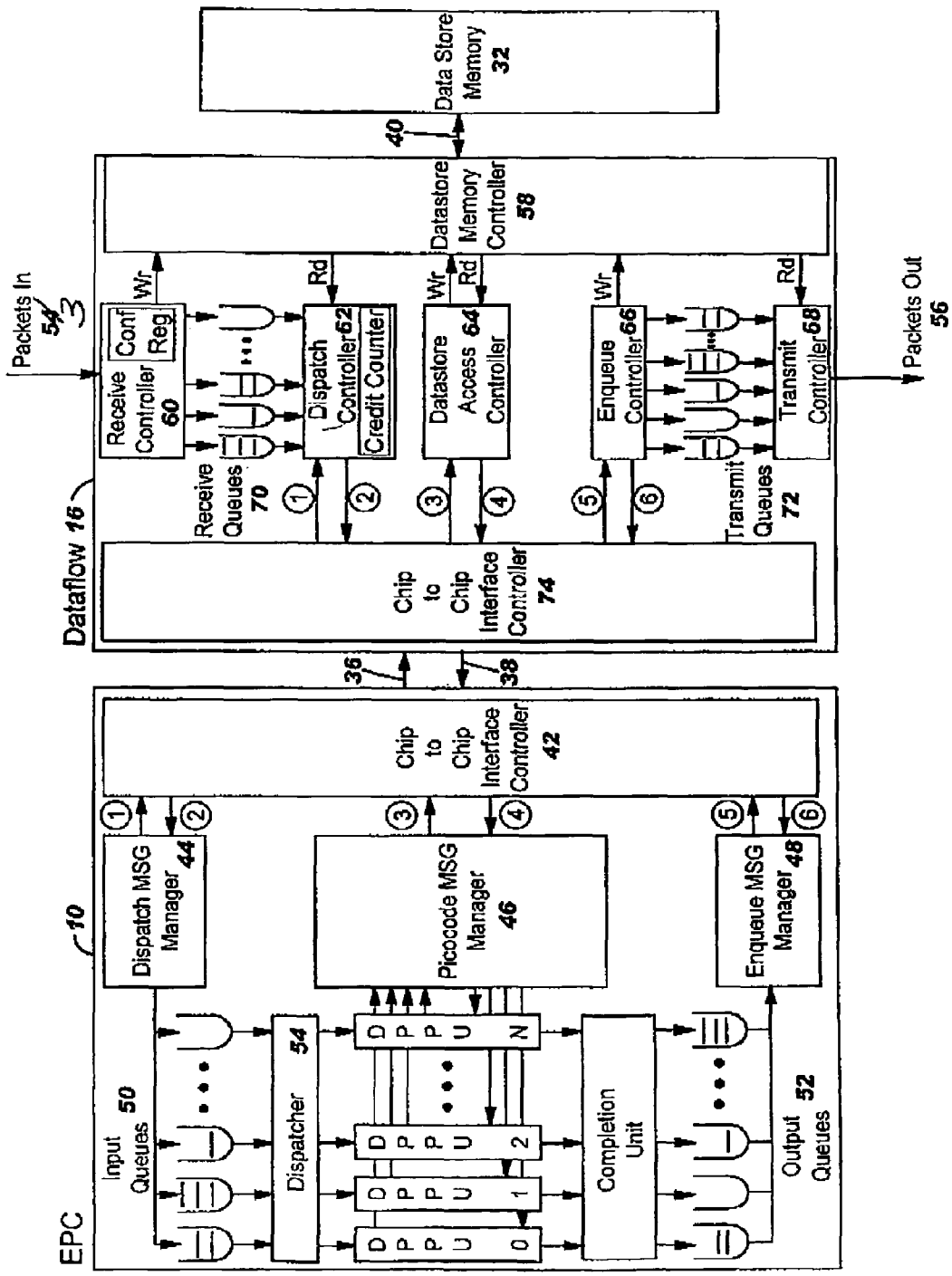
FIG. 2 shows functional representation of the Embedded Processor Complex (EPC) chip, Data Flow ASIC (Application Specific Integrated Circuit) chip and Data Flow messaging according to the teachings of the present invention.

FIG. 2 shows a more detailed block diagram of the EPC, the data flow and the messaging interface according to the teachings of the present invention. It should be noted that in FIG. 2 only those components in the EPC and data flow that are relevant to the present invention are shown. A more detailed description of the EPC is set forth in application Ser. No. 09/384,747 which is incorporated herein by reference. In FIG. 2 EPC 10 is connected to data flow 16 by chip-to-chip busses 36 and 38. Likewise, Data Flow Chip 16 is connected to Data Store Memory 32 by bidirectional bus 40. Only the components necessary to understand the messaging feature of the present invention is set forth in EPC 10 and Data Flow 16.

Still referring to FIG. 2, EPC 10 includes chip-to-chip interface controller 42 which provides the interface from EPC 10 to the busses 36 and 38, respectively. A detailed description of the chip-to-chip interface controller is set forth in patent application Ser. No. 10/016,800 incorporated herein by reference. Suffice it to say that the function of the chip-to-chip interface controller is to receive messages from the bus and forward them to the island on EPC 10 to which the message is directed. The chip-to-chip interface also conditions the messages for transmission on bus 38 in such a way that it can be transmitted on the bus. Dispatch message (MSG) manager 44, picocode message manager 46 and enqueue message manger 48 are connected by busses to the chip-to-chip interface controller 42. Dispatch message manager 44 is coupled to input queues 50. The function of the input queues is to store information that is received from the Data Flow 16. The Dispatch message manager 44 includes circuits which generate message 1 (to be discussed hereinafter) which is transmitted through the interface to Data Flow 16. The Dispatch message manager 44 also receives message 2 (described hereinafter) and stores the information received in message 2 in the appropriate input queues 50.

Still referring to FIG. 2, the picocode message manager 46 is operatively coupled to DPPU 0 through DPPU N. As stated above the functions of the DPPUs are to do the processing required for routing, modifying, etc. frames received from the Data Flow 16. The picocode message manager 46 generates the messages 3 (to be discussed hereinafter) that is forwarded to the interface and receives messages 4 (to be described hereinafter) and distributes the data to the appropriate DPPU. The enqueue message manger 48 is coupled to a plurality of output queues 52. The output queues 52 store data which is to be transmitted from EPC 10 to Data Flow 16. The enqueue message manager 48 includes circuitry which generates message 5 (to be discussed hereinafter) for transmission to the Data Flow 16 and receives messages 6 (to be discussed hereinafter) from the Data Flow 16. The output from output queues 50 are connected by Dispatcher 54 to the DPPUs. Dispatcher 54 includes circuits which transfer data from the input queues 50 to the DPPU that is not busy. As stated above, the DPPUs are operated in parallel. The output from the DPPUs are fed into the completion unit. The primary function of the completion unit is to reorder the data in the same sequence as it was received in the dispatcher and forward the data to selected one of the output queues 52.

Table 1 gives a summary of the messages that flow across the interface. In FIG. 2 the messages are identified by numerals 1–6. The same numerals 1–6 are used to identify the messages in the table. As a consequence, message 1 is a Dispatch.request message generated by the Dispatch message manager and forwarded to the Data Flow 16, 2 is the Dispatch.response message and so forth. It should be noted that the Dispatch.request and Dispatch.response are not used in the same sense as the request and response is used in general communication or computer parlance. In the common usage one unit generates a request and a response comes back as a result of this request. In the Dispatch.request and Dispatch.response they are not directly related. The Dispatch.request message is a message that gives credit to the Dispatch controller. The Dispatch.request message carries information indicating which queue has vacancy to which the dispatch controller can send information from the receive queues. The vacancy information is expressed as a value termed "credit". The dispatch controller adds to the contents of a counter which keeps track of the vacancy rate in the input queues 50. In fact, if the dispatch controller has a value in the counter then it can send data in the Dispatch.response message without receiving any Dispatch.request message.

TABLE 1

| Numbers | Message Name | Function |
| --- | --- | --- |
| 1. | Dispatch.request | Transport Credits to Data Flow |
| 2. | Dispatch.response | Transport Frame from Data Flow to EPC |
| 3. | Picocode.request | Transport Picocode commands from EPC to Data Flow |
| 4. | Picocode.response | Transport response to Picocode Request |
| 5. | Enqueue.request | Transport frames, to be transmitted onto the network, from EPC to Data Flow |
| 6. | Enqueue.response | Transport status information, from Data Flow to EPC, relative to frames received from EPC for transmission onto the network. |

Referring again to FIG. 2, Data Flow 16 manages the flow of data that is received and transmitted through the Network Processor subsystem. As a consequence it has a bus labelled Packet in 54 that receives packets or frames into Data Flow 16. Packet Out 56 is a bus that transmits packets out of Data Flow 16. Data store memory controller 58 interfaces Data Flow 16 to Data Store Memory 32. As stated above, the Data Store Memory 32 contains sufficient storage to store data passing through the Network Processor. Coupled to data store memory controller 58 are receive controller 60, dispatch controller 62, data store access controller 64, queue controller 66 and transmit controller 68. The receive controller 60 receives packets on the bus labelled Packets In 53. Depending on the setting bits in the mode control register within the receive controller, the mode in which Data Flow 16 operates is selected and causes portions of the frames or entire frames to be written in receive queues 70. The receive controller 60 also generates write signals and data which is used by the data store memory controller 58 to write the data into selected addresses of the data store memory 32.

Still referring to FIG. 2, the Data Flow 16 can be set in one of three modes, namely; header dispatch mode, cut and paste mode, and full frame mode. Details of these modes will be given below. Suffice it to say that depending on the mode in which the Data Flow 16 is set only the header or the complete frame is loaded into receive queue 70. The output from the receive queue 70 are fed into Dispatch Controller 62. The Dispatch Controller 62 receives dispatch message 1 which contains the vacancy information and queue identity of queues in the input queues 50 to which Dispatch Controller 62 can forward data using message 2. The Dispatch Controller 62 also reads data from memory which is provided on the bus labelled Rd.

The Data Store Access Controller 64 receives messages 3 generated by the microcode. These messages can either request writing or reading information to/from the storage. For a write, the write information is received in Data Store controller 64 which generates the write message and delivers it to Data Store Memory Controller 58 for writing in the Data Store Memory 32. If the message is for reading, the information is read out from the storage and Data Store Access Controller 64 formulates message 4 which is sent to the respective DPPU. The Enqueue Controller 66 receives frames in message 5 which are placed in transmit queues 72 and is subsequently transmitted by transmitter controller 68 on the bus labelled Packets Out 56. The transmit controller 68 can also read data from the Data Store Memory 58 for transmission on the bus labelled Packets Out 56. The Enqueue Controller 66 also generates message 6 which is returned to the Enqueue Message Manager 48. Information outputted from the Data Flow 16 to EPC 10 is controlled by chip-to-chip interface 74. More details of chip-to-chip interface 74 are set forth in the application Ser. No. 10/016,800 which is incorporated herein by reference.

As can be seen from Table 1 and FIG. 2 a limited message set numbers 1–6 are used to transmit data and control information between the EPC 10 and Data Flow 16. In addition, two additional messages, described hereinafter, are used to transmit data when the frame is larger than a set value. FIGS. 3A–3G give the format for these messages which will now be described individually.

FIG. 3A gives the format for the Dispatch.request message which is labelled 1 in FIG. 2 and the Table 1. The message carries the credits (vacancy information in the input queues) and is used by Dispatch Controller 62 to forward data to the input queues 50. The Dispatch.request is a 4-bytes message from the EPC 10 to Data Flow 16. The message issues "credits" for the Data Flow 16 to dispatch frames to the EPC 10. The message provides a flow control mechanism to ensure that the Data Flow 16 does not overrun or overflow the EPC input queues 50. The message includes the following fields:

credits—the Data Flow 16 adds the value in this field to the current value of its credit counter. Each time the Data Flow 16 transfers a frame to the EPC via Dispatch..response message 2 it decrements the value of its credit counter by 1. The Dispatch message manager 44 in EPC 10 continually monitors the levels of information in the input queues 50 and replenishes the credit as buffer space in the input queues are free. Should the Data Flow 16 credit counter reach 0 it must refrain from dispatching any frames to the EPC 10. The field labelled input Queue # identifies at least a queue in input queues 50 (FIG. 2) to which the information is to be sent.

FIG. 3B shows a format for the Dispatch.response message which is a variable length message that transfers up to 128 bytes of a frame or frame header and its associated control information from the Data Flow 16 to EPC 10. The Dispatch.response message includes the following fields:

Control Length—a 4-bit field that specifies the number of words of control information in the message. It is generated by the Dispatch Controller 62 and used by the Dispatch Message Manager 44 to delineate the messages' controlled information and frame data fields. It permits the controlled information field to be variable in length. Supported values are from one to eight words.

Segment Control—a 4-bit field used to control segmenting of large frame data transmission into multiple dispatches. It includes a bit to indicate when the transfer of frame data has completed, a bit to indicate the frame transfer has been aborted by the data flow and two bits to indicate how many valid bytes of data are in the final word transfer of frame data.

Control Information—the Control Information field may occupy 1–8 words and may include any information relating to the frame that the Data Flow 16 wishes to transfer to the EPC. The format of this field is defined per the data flow ASIC implementation. It typically includes information such as a "frame handle". A "frame handle" is a unique value used to identify a specific frame within the EPC/Dataflow ASIC environment. The Dataflow ASIC assigns unique frame handle to each frame as they arrive from the network. This frame handle is passed to the EPC in a Dispatch.response message. The EPC may then uses this frame handle to reference the frame in messages exchanged with the Dataflow ASIC. Frame length, source port, CRC check results and frame classification information.

Frame Data—this field contains frame data to be transferred to EPC picocode for use in processing of the frame. It may include from 1 to 128 bytes of frame data. If more than 128 bytes of frame data are to be transferred, then the remaining data is transferred in one or more subsequent DispatchMore.response messages (described below).

FIG. 3C shows a DispatchMore.response message. This message is used only when dispatching more than 128 bytes of data from a frame. The first 128 bytes are dispatched via a Dispatch.response message. Any additional data is segmented into 128-byte chunks and transferred in one or more subsequent DispatchMore.response messages. The DispatchMore.response message includes a 4-byte message header followed by the packet data (the control information field is included only in the initial Dispatch.response message). It includes a "segment control" field and "frame data" fields that are equivalent to the same fields in the Dispatch.response message discussed above.

FIG. 3D shows a format for the Enqueue.request message. This Enqueue.request message identified by numeral 5 (Table 1 and FIG. 2) is generated by the enqueue message manager 48 (FIG. 2) and forwarded to enqueue controller 66 when information in output queues 52 is to be enqueued for transmission to the network from Data Flow 16. Stated another way, the Enqueue message is generated by Enqueue Message Manager 48 to instruct Enqueue Controller 66, in Data Flow 16, to enqueue a frame for transmission. The Enqueue message includes the Enqueue.request/response message pair and an EnqueueMore.request response message pair. The Enqueue.request message is a variable length message that transfers control information and operational frame alteration commands and/or frame data from the EPC 10 to the Data Flow 16. The Enqueue.request message includes the following fields:

Control Length—a 4-bit field that specifies the number of words of controlled information in the message. It is generated by picocode and used by the Data Flow ASIC to delineate the messages' controlled information from the frame alteration or frame data fields. It permits the controlled information field to be variable in length. Supported values are from one to eight words.

Segment Control—a 4-bit field used to control segmenting of large frame data transmissions into multiple Enqueue/ EnqueueMore messages. It includes a bit to indicate when the transfer of frame data has completed, and two bits to indicate how many valid bytes of data are in the final word transfer of the frame data.

Control Information—the Control Information field may occupy from one to eight words and may include any information relating to the frame that the EPC picocode may wish to transfer to the Data Flow ASIC. The format of this field is defined by the Data Flow ASIC implementation. It typically includes information such as frame handle, frame length, target queue, QoS to be applied to the frame, etc.

Frame Alteration Commands—EPC 10 picocode may optionally use this field to transfer 16 or 32 bytes of frame alteration commands to be executed by the Data Flow ASIC.

Frame Data—Picocode may optionally use this field to transfer frame data from the EPC packet buffer to the data flow ASIC. It may include from 1 to 128 bytes of frame data.

If more than 128 bytes of frame data are to be transferred, the frame is deemed large and the remaining data is transferred in one or more subsequent EnqueueMore.request messages.

FIG. 3E shows the format for the Enqueue.response message which is a 4-byte message from the data flow ASIC to the EPC. The Enqueue.response message acknowledges the receipt of the Enqueue.request and specifies a counteraction for the frame. The Enqueue.response message includes the following fields:

Counter Action—The data flow ASIC sets this field to indicate whether the frame was successfully forwarded or discarded by the congestion control function. It is optionally used by the EPC 10 to increment the appropriate statistics counters. Other fields include the message type field and correlation field. Both fields have already been described above and not repeated here.

FIG. 3F shows the format for the EnqueueMore.request message which is used only when enqueuing more than 128 bytes of data from a frame. The first 128 bytes are transferred via an Enqueue.request message. Any additional data is segmented into 128-byte chunks and transferred in one or more subsequent EnqueueMore.request messages. An EnqueueMore request includes 4-byte message header followed by the packet data (the control information in FACB fields are included only in the initial Enqueue.request message). It also includes a segment control and frame data fields that are equivalent to the same field in the Enqueue.request message.

FIG. 3G shows the format for the EnqueueMore.response message which has 4 bytes transferred from Data Flow to EPC to acknowledge reception of an EnqueueMore.request message (EMRM). A message type field and correlation field (previously described) are also provided.

It should be noted that the EPC picocode has the ability to generate a request message with any type and content for transmission to the data flow ASIC. State machines within the data flow ASIC decode the request message and return the requested information or acknowledgment to the EPC in a response message. The EPC sets a correlator field in the request message that allows the response message to be returned directly to the picocode thread that initiated the request. The messages in this category are defined by the Data Flow ASIC implementation. Some examples of messages in this category that may be defined includes:

Simple read and write requests for accessing and updating configuration register.

Data Store Memory reads and writes for accessing and updating frame data.

Buffer lease and chaining operations for manipulating frame structure.

Frame "split" and join request for IP fragmentation and reassembly applications.

FIGS. 4A, 4B and 4C show graphical representations of the different modes in which the Network Processor can be configured according to the teachings of the present invention. A 2-bit configuration register in the Receive Controller 60 (FIG. 2) can be used to select a desired mode. In an alternate embodiment the Network Processor is constrained to operate in a fixed mode in which one of the modes is adopted embedded in the Network Processor and cannot be changed. For consistency elements in the respective views that are like elements previously described will be identified by the same numeral. As a consequence, in each of the views, the EPC is represented by numeral 10, Data Flow (DF) ASIC is represented by 16 and Data Store (DS) is represented by 32. The mode in which the Network Processor can be configured includes the Full Frame Mode, Cut and Paste Mode and Header Dispatch Mode. In the Full Frame Mode, shown in FIG. 4C, the frame is received in DF 16 and is forwarded along path 76 to EPC 10 for further processing. The EPC 10 performs the necessary table searches and frame modification before transferring the entire frame along path 78 through DF 16 to DS 32. When it is time to transmit the frame, the DF 16 moves the frame from DS 32 along path 80 to wherever it is supposed to be transmitted.

In the Cut and Paste Mode, FIG. 4B, the frame is received in DF 16 along path 82. DF 16 partitions the frame by sending the body of the frame to DS 32 and the header to EPC 10 for processing. Following processing on the header by EPC 10 it is returned on path 84 through DF 16 to DS 32 whereat the header is pasted or rejoined to the body previously stored in DS 32. The entire frame (i.e. body and header) is transferred along path 86 to its destination.

In the Header Dispatch Mode, shown in FIG. 4A, the frame is received and transferred along path 88 into DS 32 for storage. The header of the frame is then transmitted from DS 32 through DF 16 along path 90 to the EPC 10 which processes the header. Since the header is already in storage 32 the EPC 10 returns a frame alteration control block (FACB) carrying control information which is used to alter the frame in DS 32. Once the alteration is completed the frame is transmitted from DS 32 along path 92 to its destination.

Figure 5A:
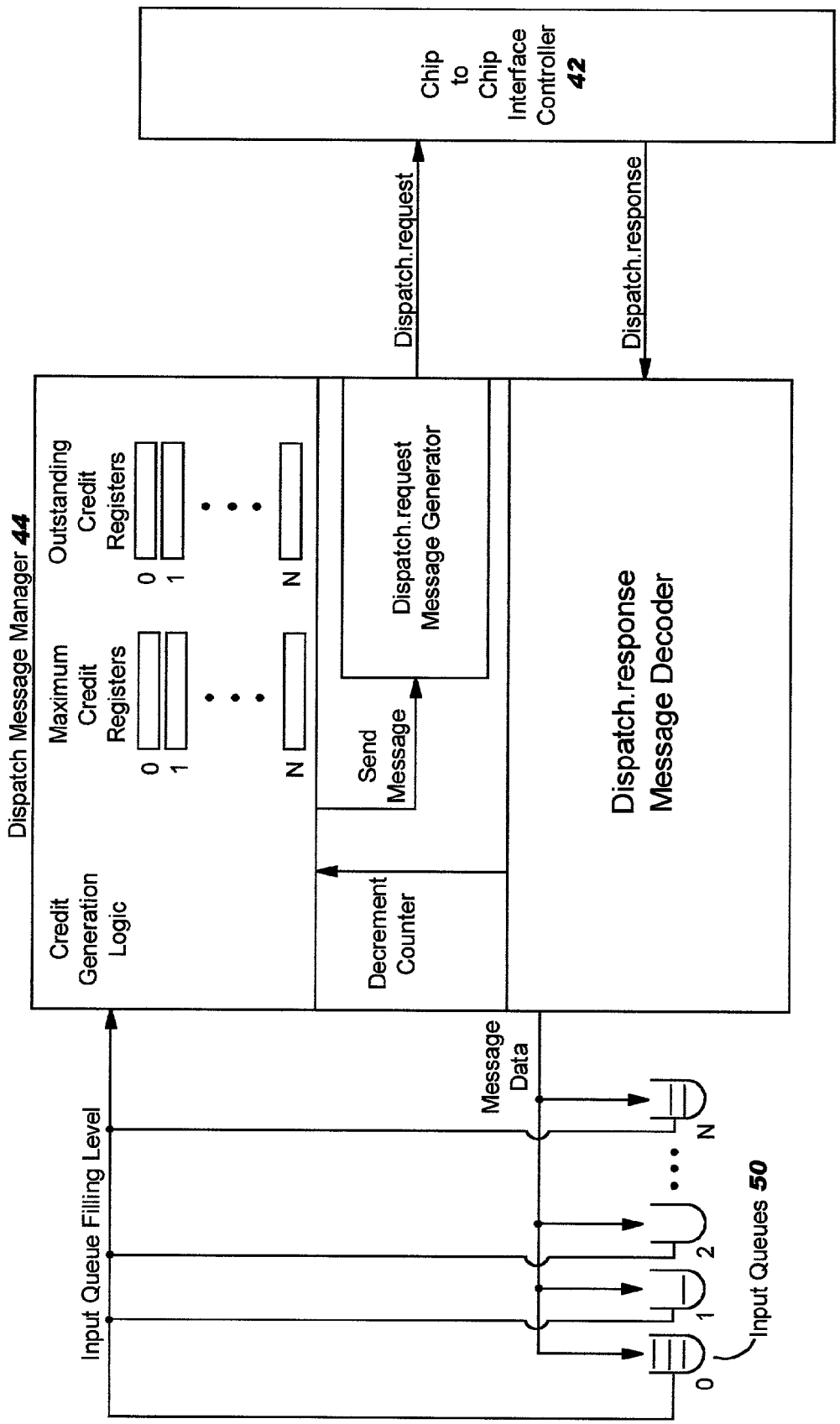
FIG. 5A shows a block diagram of the dispatch message manager.

FIG. 5A shows a block diagram of the Dispatch Message Manager which includes credit generation logic for managing the flow of dispatch messages, a Dispatch.request message generator for generating messages that transfer credits to the Dataflow ASIC, and a Dispatch.response message decoder which receives and processes frames dispatched by the Dataflow ASIC. The credit generation logic includes a maximum credit register and an outstanding credit register for each of the input queues maintained in the EPC. The maximum credit registers specify the maximum number of credits to be issued for transfer of frames into each input queue. The outstanding credits registers maintain a current count of the number of credits that have been issued to the Dataflow ASIC for transfer of frames into each input queue. The credit generation logic also monitors the filling level of the number of frames currently stored in each of the input queues. The number of credits to be issued to the Dataflow ASIC for each input queue is then calculated by subtracting the filling level of the queue and the outstanding credits register for the queue from the maximum credits register for the queue. If this number is positive, then the credit generation logic issues a request to the Dispatch.request message generator to transfer the credits to the Dataflow ASIC. The credit value to be transferred is then added to the outstanding credits register for that queue. The Dispatch.request message generator then generates and sends a Dispatch.request message including parameters which specify the number of credits being transferred and the queue to which the credits correspond. As an independent task, the Dispatch.response message decoder receives Dispatch.response messages from the Dataflow ASIC, decodes the input queue parameter from the message to determine which input queue the frame should be placed in, and transfers the Dispatch.response message into the specified input queue. With each Dispatch.response message received, the Dispatch.response message decoder sends a decrement counter signal to the credit generation logic to decrement the outstanding credit counter for the corresponding input queue by one. For frames in which more than 128-bytes of data is dispatched, then Dispatch.response message manager receives subsequent DispatchMore.response messages until the full amount of frame data has been transferred from the Dataflow ASIC and deposited into the input queue. Elements which are identical to previously described elements are identified by the same numerals and are not described further.

Figure 5B:
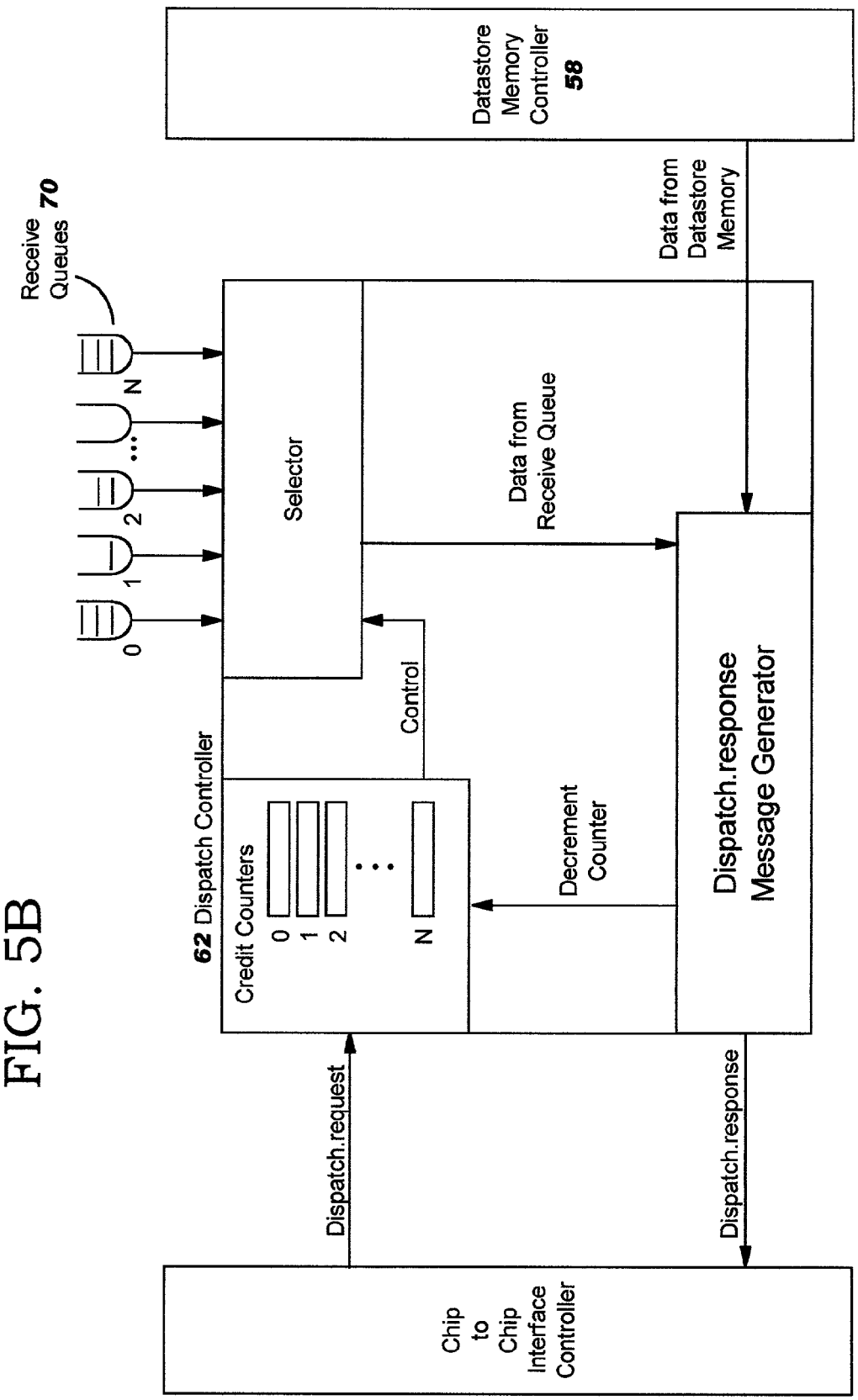
FIG. 5B shows a block diagram of the dispatch controller.

FIG. 5B shows a block diagram of the Dispatch Controller which includes a credit counters function for managing the credits issued by the EPC, a selector function for reading information about the next frame from the receive queues, and a Dispatch.response message generator function for generating the message that transfers frames to the EPC. The credit counters function receives and decodes Dispatch.request messages sent by the EPC. The "credits" value from the message is added to the credit counter specified in the input queue number field of the message. The credit counter function then uses control signals to notify the selector function which input queues in the EPC are available for receiving frames from the receive queues. Each input queue in the EPC has a corresponding receive queue in the Dataflow ASIC. If one or more frames occupy a receive queue and the corresponding credit counter for that queue is non-zero, then the selector reads the frame information from the receive queue and transfers it to the Dispatch.response message generator. The Dispatch.response message generator then reads frame data from datastore memory as required to generate and send the Dispatch.response message to the EPC. Upon sending a message, the Dispatch.response message generator sends an decrement counter signal to the credit counters function to request that the credit counter corresponding to the frame's receive queue be decremented. For frames in which more than 128-bytes are to be dispatched, the Dispatch.response message generator sends additional DispatchMore.response message until the full amount of frame data has been transferred to the EPC. Elements common with previously described elements are identified by like numerals.

FIG. 5C shows a block diagram of the Enqueue Message Manager which includes a selector function for reading frames from the output queues, a Enqueue.request generator for generating Enqueue.request messages to be sent to the Dataflow ASIC, and an Enqueue.response decoder for decoding Enqueue.response messages received from the Dataflow ASIC. The selector function reads frames and their associated control information from the output queues and presents them to the Enqueue.request generator. Frames may be read by the selector from the plurality of output queues using various well known algorithms such as round robin or fixed priority. The Enqueue.request generator receives a frame and its associated control information and uses it to generate and send an Enqueue.request message to the Dataflow ASIC. For frames with more than 128-bytes of data, subsequent EnqueueMore.request messages are generated until the full amount of frame data is transferred. Included in the control information passed from the output queue is counter information for the frame. The counter information for each frame is passed to the Enqueue.response decoder where it is held until the corresponding Enqueue.response message is received for the frame. When the Enqueue.response decoder receives the Enqueue.resopnse, it extracts the counter action and correlator parameters from the Enqueue.response. The Enqueue.response decoder uses the correlator field to retrieve the counter information previously stored for the frame. The counter information and counter action are then transferred to the counter manager function. The counter manager then uses this information to increment the appropriate statistical counter stored in counter memory. The address of the counter to be updated is formed by adding the counter action field to the counter address provided as part of the counter information. Thus one of a number of different counters is updated per the counter action provided by the Dataflow ASIC.

Figure 5D:
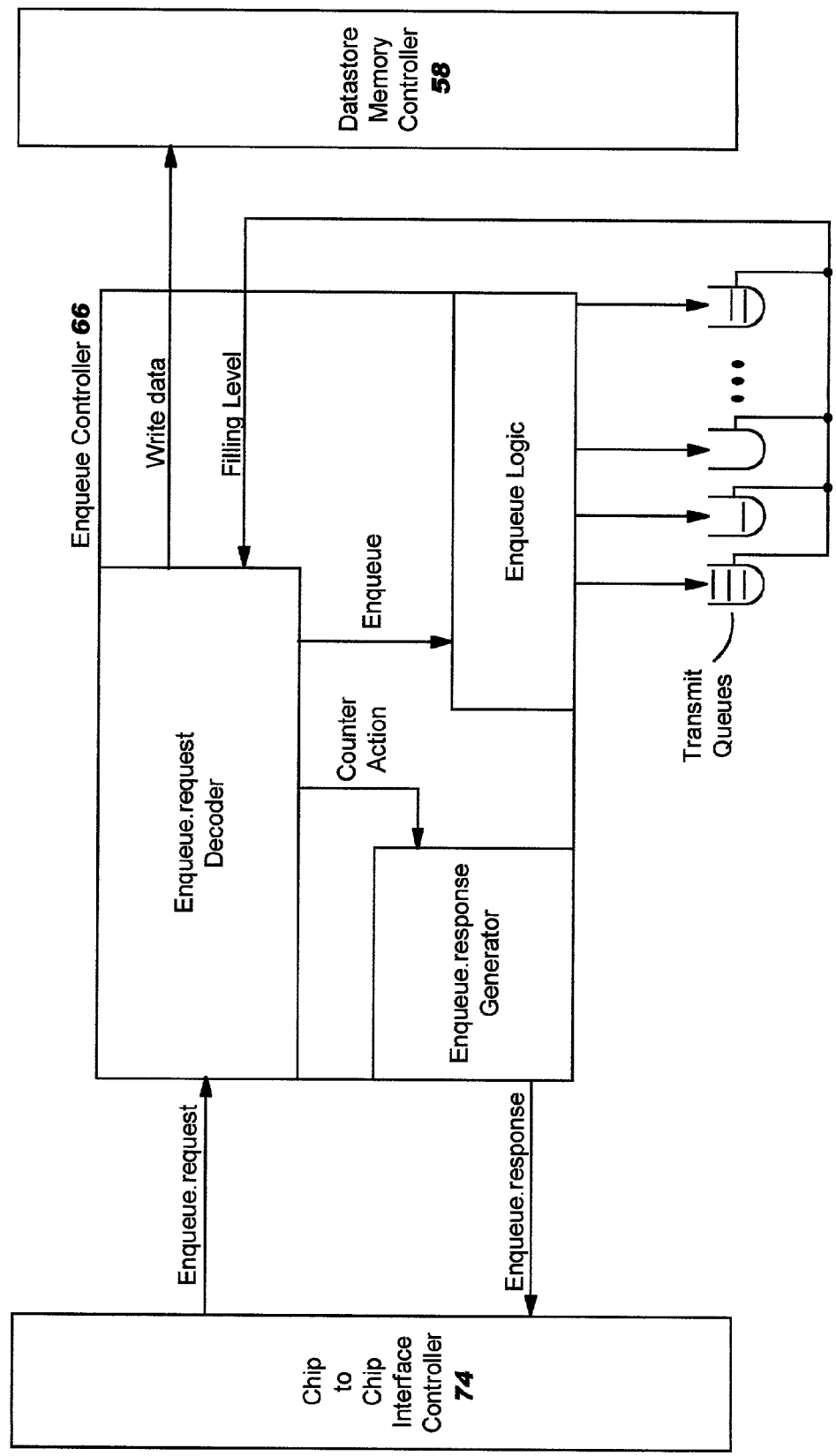
FIG. 5D shows a block diagram of the enqueue controller.

FIG. 5D shows a block diagram of the Enqueue Controller that includes an Enqueue.request decoder which receives and processes the Enqueue.request messages received from the EPC, an enqueue logic function which enqueues frames into transmit queues, and an Enqueue.response generator which generates and sends an Enqueue.response message to the EPC. The Enqueue.request decoder receives frames and their associated control information from the EPC in Enqueue.request messages. For frames with more than 128-bytes of data, subsequent EnqueueMore.request messages are transferred until the full amount of frame data is received. The control information included in the Enqueue.request message indicates which transmit queue the frame is to be enqueued into. The Enqueue.request decoder receives input signals from the transmit queues indicating the filling level of each queue. If the Enqueue.request decoder detects that a frame is destined for a transmit queue that is full, then it will discard the frame to prevent the queue from overflowing. Or as an alternate implementation, the Enqueue.request decoder may use well known congestion control algorithms such as random early discard (RED) to randomly discard frames when the transmit queue is approaching a full state. If the frame is to be enqueued into a transmit queue, then the Enqueue.request decoder transfers the frame to the enqueue logic through the enqueue signals. The enqueue logic then enqueues the frame directly into the specified transmit queue. If the frame is to be discarded, then no enqueue signal is activated to the enqueue logic. When performing an enqueue, the Enqueue.request decoder first writes the frame data into datastore memory, and then requests that the enqueue logic place a pointer to the frame into the specified transmit queue. For each Enqueue.request received, the Enqueue.request decoder uses the counter action signals to indicate to the Enqueue.response generator what type of Enqueue.response should be generated. The counter action field sent to the EPC in the Enqueue.response message is set in a different state if the frame was enqueued or discarded. In addition, different counter action values may be sent to further indicate the reason why the packet was discarded. The Enqueue.response generator also generates and sends EnqueueMore.response messages for each EnqueueMore.request message received by the Enqueue.request deocoder. The EnqueueMore.response message includes no variable parameters and serves only as an acknowledgement to the EPC that the corresponding EnqueueMore.request message has been received and processed.

Having described the details of the present invention, its operation will now be described.

A packet arrives from a network such as Ethernet or Packet-over-SONET (POS). The packet is processed by the "receive controller" of the Data Flow ASIC. The receive controller enqueues the packet onto the tail of one of a plurality of receive queues.

In "header dispatch" mode the entire packet is written into datastore memory and the input queue contains only a pointer to the packet.

In "cut & paste" mode the packet header (first N bytes) is placed in the input queue along with a pointer to the remainder of the packet that is stored in datastore memory. If the size of the packet is less than or equal to N, then the entire packet is stored in the input queue and no packet data is stored in datastore memory.

In "full frame" mode the entire packet is placed into the input queue and nothing is stored in datastore memory.

The "dispatch controller" dequeues packets from the head of the receive queues and transfers them to the EPC in a Dispatch.response message (see "2" in FIG. 2). The dispatch controller cannot send Dispatch.response messages to the EPC unless it has received the appropriate "credits" from the EPC in a Dispatch.request message (1).

In "header dispatch" mode the pointer from the input queue is used to fetch the packet header from datastore memory. The packet header is then included in the Dispatch.response message.

In "cut & paste" or "full frame" mode the packet data stored in the input queue is transferred in the Dispatch.response message. No data is read from datastore memory.

The Dispatch.response message travels across the chip to chip bus and arrives at the "dispatch message manager" in the EPC. The dispatch message manager enqueues the packet onto the tail of one of a plurality of input queues. The dispatch message manager is also responsible for sending Dispatch.request messages to the Data Flow ASIC. As space becomes available in the input queues for additional packets, it sends Dispatch.request messages to notify the Data Flow ASIC that additional packets may be transferred to the EPC in subsequent Dispatch.response messages.

The "dispatcher" dequeues a packet from an input queue and transfers it to one of a plurality of Dyadic Protocol Processor Units (DPPUs). Each DPPU contains multiple processor threads. Each thread is capable of processing one packet at a time. When a DPPU thread completes processing a packet, the dispatcher transfers another packet to that thread for processing.

The DPPU executes software (also called "picocode") for the purpose of processing the packet. When processing a packet, it may be necessary for software to modify the data in the packet. The technique used depends on the mode of operation:

In "header dispatch" mode all modifications to the packet are performed on the data in datastore memory. Software creates a Picocode.request message (3) and sends it to the Data Flow ASIC via the "picocode message manager". In the Data Flow ASIC, the message is routed to the "datastore access controller" which decodes the request and performs the requested read or write of datastore memory. The datastore access controller then sends a Picocode.response message (4) to the EPC. For read operations, it contains the requested read data. For write operations it contains an acknowledgment that the write transaction has been completed. The read and write operations may perform various functions such as read or write of packet data, read or write of link list pointers used to link multiple data buffers into a packet, or read or write of pointers for maintenance of a free buffer list. The Data Flow ASIC decodes the parameters placed by software in the Picocode.request messages to determine the exact function being requested.

In "cut & paste" mode, data that is part of the first "N" bytes of a packet may be modified directly in the local memory within the DPPU. For modifying data beyond the first "N" bytes, software uses Picocode.request and Picocode.response messages to read and write datastore memory in the same manner as with the header dispatch mode.

In "full frame" mode all packet modifications are performed directly in local memory within the DPPU.

Upon completion of software processing by the DPPU, the packet is enqueued via the "completion unit" into one of a plurality of output queues.

The "enqueue message manager" services the output queues and sends an Enqueue.request message (5) over the chip to chip bus to the Data Flow ASIC. The packet data included in the Enqueue.request message depends on the mode of operation:

In "header dispatch" mode no packet data is included in the enqueue message. The message includes a pointer to where the packet data is located in datastore memory.

In "cut & paste" mode the first "N" bytes of packet data along with a pointer to the remaining packet data in datastore memory are included in the enqueue message. The "N" bytes of data may include modifications made to the data by software. These modifications may result in the length of the packet data passed to the DPPU being more or less than the original "N" bytes included in the Dispatch.response message.

In "full frame" mode the entire updated packet is included in the Enqueue.request message.

The Enqueue.request message arrives at the Data Flow ASIC and is routed to the "enqueue controller". The enqueue controller then checks the filling level of the target transmit queue specified in the enqueue message. If the filling level exceeds a programmable threshold, then the packet is discarded (or may be randomly discarded) without being transmitted. If the filling level does not exceed the threshold, then the packet is enqueued into a transmit queue (see next step). An Enqueue.response message (6) is sent to the EPC to inform it whether the packet was discarded or enqueued for transmission. The EPC enqueue message manager decodes this message and increments the appropriate statistics counter to indicate whether the packet was discarded or forwarded.

The enqueue controller enqueues the packet onto the tail of one of a plurality of transmit queues to await transmission onto the network. The packet data included in the Enqueue.request message is handled as follows depending on the mode of operation:

In "header dispatch" mode the packet data already resides in datastore memory and a pointer to the packet data is enqueued into a transmit queue.

In "cut & paste" mode the enqueue controller writes the packet data from the Enqueue.request message into datastore memory where it is re-joined with the body of the packet previously stored in datastore memory. A pointer to the packet data is then enqueued into a transmit queue.

In "full frame" mode the enqueue controller writes the entire packet into datastore memory and a pointer to the packet data is enqueued into a transmit queue.

The transmit controller services the transmit queues using a round robin or other algorithm. As packets are transmitted, a pointer to the packet is dequeued from the head of a transmit queue and the packet data is read from datastore memory. The packet is then transmitted via the network interface.

Even though the present invention has been described in accordance with the embodiment shown, one of ordinary skill in the art will readily recognize that there could be variations to the embodiments and those variations would be within the spirit and scope of the present invention. Accordingly, any modifications may be made by one of ordinary skill in the art without departing from the spirit and scope of the appended claims.

What is claimed is:

1. A system comprising:
   an EPC (Embedded Processor Complex) including at least one processor;
   first circuit arrangement, operatively coupled to said EPC, that generates a dispatch request message with a field to carry indicia indicating space availability in input queues associated with said EPC;
   second circuit arrangement, operatively coupled to said EPC, that generates enqueue request message used to transport frames enqueued in output queues associated with said EPC; and
   a third circuit arrangement, operatively coupled to said EPC, that generates picocode request message that transport commands issued by said at least one processor.

2. The system of claim 1 wherein a format for each of the message includes a first field to carry a name identifying the message; second field to carry an indicia used to correlate each of the request message with a response message; and a variable length field that transports data associated with the message.

3. The system of claim 1 further including buffer in said first circuit arrangement to receive a Dispatch.response message and DispatchMore.response message.

4. The system of claim 3 wherein a format for the Dispatch.response message includes control length field in which the number of words of control information in the message is specified, segment control field used to control segmenting of a frame having more than 128 bytes of data into multiple segments, control information field used to carry information relative to the frame and frame data field to carry frame data.

5. The system of claim 4 wherein the segment control field includes four bits, one of which indicates completion of frame transfer, another of which indicates abortion of frame transfer and two others indicating number of valid bytes of data in the frame.

6. The system of claim 3 wherein a format for the DispatchMore.response message includes a message type field carrying information to identify a message type correlator field carrying information to associate a response to a request, segment control field carrying information relative to a segment of a frame that is being carried.

7. The system of claim 1 wherein a format for a Dispatch.request message includes a first field carrying an indicia indicating the Dispatch.request message, a second field with a value indicating credits and a queue number indicating the queue to which the credit applies.

8. The system of claim 1 wherein the second circuit arrangement further generates an EnqueueMore.request message.

9. The system of claim 8 wherein a format for a Enqueue.request message includes a message type field carrying information to identify the message, correlator field carrying information to associate a response to a request, control length field carrying information specifying a number of words of control in the message, a Segment Control Field carrying information to control segmentation of frames whose size is greater than 128 bytes, control information field carrying information relating to the frame and frame data field carrying frame data.

10. The device of claim 9 further including frame alteration command field to carry frame alteration command.

11. The device of claim 8 wherein the second circuit arrangement includes a buffer to receive Enqueue.response message and EnqueueMore.response message.

12. The device of claim 11 wherein a format for the Enqueue.response message includes a message type field to carry information identifying the message, a correlator field to carry information to associate a response with a particular request and a Counter action field to carry information to indicate whether the frame was successfully forwarded or discarded.

13. The device of claim 8 wherein a format for the EnqueueMore.request message includes a message type field to carry information identifying the message type, a correlator field to carry information to associate the request with a response and a segment control field to carry information to control segmentation of a frame.

14. The device of claim 11 wherein a format for the EnqueueMore.response message includes message type field to carry information to identify message type, correlator field to carry information associating the response to the request and a field carrying acknowledgment of receipt of an EnqueueMore.request message.

15. A method to communicate with EPC in a Network Processor comprising acts of:
   a) generating with circuits in said EPC a Dispatch Request message including indicia identifying the message, a credit indicating vacancy in queues in said EPC and a number to identify the queues associated with the credit;
   b) transmitting said Dispatch request message;
   c) receiving in said EPC a Dispatch response message including a control length field in which the number of words of control information in the Dispath response message is specified, segment control field used to control segmenting frame of data whose size is greater than 128 bytes into multiple segments, control information field used to carry information relative to the frame and frame data field to carry frame data.

16. The method of claim 15 further including acts of processing frames received in the Dispatch response message; and
   generating and forwarding Enqueue message requesting enqueuing processed frames for transmission.

17. The method of claim 16 further including acts of picoprocessors in said EPC executing picocode to generate a category of messages including read/write request for accessing and updating configuration register, data memory reads and writes to access and update frame data, buffer lease and chaining operations to manipulate frame structures and frame split and join requests for IP (Internet protocol) fragmentations and reassembly operations.

18. A data flow chip including:
   receive queues for storing frames:
   a register to store a code representing one of a plurality of modes in which said data flow chip is to operate;
   a receive controller receiving frames from an input bus, reading the code to detect the mode and loading received frames into said receive queues to be consistent with the mode:
   a credit counter for storing a count representative of data units to be transmitted from the data flow chip;
   dispatch controller, responsive to the count in said credit counter, to generate a Dispatch.response message having at least a message type field and a data field, to loading packets of data from the receive queues in said data field and to transmitting said Dispatch.response message to a remote device.

19. The data flow chip of claim 18 further including said dispatch controller receiving a Dispatch.request message containing a value representative of data units permitted to be transmitted.

20. The data flow chip of claim 19 wherein the Dispatch.request message includes identity of input queues in the remote device to which data is to be transmitted.

21. The data flow chip of claim 18 further including an enqueue controller receiving an Enqueue.request message, including at least a message identification code, data and identity of transmit queues in which data is to be placed, analyzing the Enqueue.request message and distributing the data to the transmit queues set forth in said Enqueue.request message.

22. The data flow chip of claim 21 wherein the enqueue controller further generates and transmits an Enqueue.response message including at least a message identification code, a correlator and counter action taken relative to instructions set forth in the Enqueue.request message.

23. The data flow chip of claim 18 wherein the plurality of modes include full frame mode in which the receiver controller stores an entire received frame in the receive queues;
cut and past mode in which the receive controller partitions a received frame into a header portion which is stored in the receive queues and a body portion which is stored in a memory; and
a header dispatch mode in which the entire received frame is stored in the memory.

24. A device for transporting information comprising:
a dispatch controller that generates and transmits a Dispatch.response message including at least a message type field carrying information to identify the message, control length field carrying information that specifies a number of words of control information in the message, segment control field carrying information to control segmenting of frame with data transmission greater than 128 bytes into multiple dispatches, control information field carrying control information relating to a frame, and frame data field carrying frame data wherein the segment control field includes n bits in which one bit indicating when transfer of frame data has complete, one bit indicating frame transfer has been aborted and two bits indicating how many valid bytes of data are being transmitted.

25. A method to transmit data including the acts of:
generating, in a first module, a Dispatch.response message having at least a message type field carrying information identifying the message, control length field carrying information that specifies a number of words of control information in the message, segment control field carrying information to control segmenting of frame of data with size greater than 128 bytes into multiple segments wherein the segment control field includes n bits in which one bit indicating when transfer of frame data has completed, one bit indicating frame transfer has been aborted and two bits indicating how many valid bytes of data are being transmitted, control information field carrying control information relating to a frame, and frame data field carrying frame data;
loading selected fields in said message with predetermined information; and
transmitting to a second module the message with the loaded information.

26. A device for transporting information comprising:
a dispatch message manager that generates and transmits a Dispatch.request message having at least a message type field to carry information identifying the message, a credit field to carry a value representing vacancy in queues of the device generating the message, and queue number field to carry queue number of the queue having vacancy.

27. A method to transmit data comprising the acts of:
generating, in a first module with a dispatch message manager, a Dispatch.request message having at least a message type field to carry information identifying the message, a credit field to carry a value representing vacancy in queues of the first module generating the message, and queue number field to carry queue number of the queue having vacancy;
loading selected fields of said message with information; and
transmitting to a second module, the message with loaded information.

28. A device for transporting information comprising:
an enqueue message manager that generates and transmits an Enqueue.request message having at least a message type field carrying information to identify the message, control length field carrying information that specifies the number of words of control information in the message, segment control field carrying information to control segmenting of a frame whose size is greater than 128 bytes into multiple dispatches, said segment control field including one bit indicating end of data transmission and two bits indicating how many bytes of valid data in a final word of a transmission, control information field carrying control information relating to a frame, and frame data field carrying frame data and frame alteration field to carry commands to alter the frame.

29. A method to transmit data comprising the acts of:
generating, in a first module with an enqueue message manager, a message having at least a message type field carrying information to identify the message, control length field carrying information that specifies the number of words of control information in the message, segment control field carrying information to control segmenting of a frame whose size is greater than 128 bytes into multiple dispatches, said segment control field including one bit indicating end of data transmission and two bits indicating how many bytes of valid data in a final word of a transmission, control information field carrying control information relating to a frame, frame data field carrying frame data and frame alteration field to carry commands to alter the frame;
loading selected fields of said message with information; and
transmitting to a second module the message with loaded information.

30. An EPC chip comprising:
a plurality of input queues;
a dispatch message manager that generates a message having at least a message type field to carry information identifying the message, a credit field to carry a value representing vacancy in the input queues, and queue number field to carry queue number of the input queues having the vacancy;
a dispatcher that accesses the input queues and transmits data therefrom;
a plurality of processors that process data received from said input queues:

a completion unit, operatively coupled to the processors, that arranges the data in a sequence in which said data was presented to the processors;

a plurality of output queues operatively coupled to the completion unit; and an enqueue message manager operatively coupled to the output queues.

31. The EPC of claim 30 further including:

a first chip-to-chip interface controller operatively coupled to the dispatch message manager and the enqueue message manager; and a picocode message manager coupling the plurality of processors to the first chip-to-chip interface controller.

32. The EPC of claim 31 further including:

a data flow chip; said data flow chip comprising a second chip-to-chip interface controller;

a transmission channel including a transmit bus and a receive bus interconnecting the first chip-to-chip interface controller and the second chip-to-chip interface controller;

a register to store a code representing one of a plurality of modes in which said data flow chip is to operate;

a credit counter for storing a count representative of data units to be transmitted from said dataflow chip to said EPC; and dispatch controller, responsive to the count in said credit counter, and the code in said register to generate a Dispatch.response message having at least a message type field and a data field, loading packets of data in said data field and transmitting said Dispatch.response message to said EPC.

33. The EPC chip of claim 30 wherein the enqueue message manager generates a message having at least message type field carrying information to identify the message, control length field carrying information that specifies the number of words of control information in the message, segment control field carrying information to control segmenting of a frame whose size is greater than 128 bytes into multiple dispatches, control information field carrying control information relating to a frame, frame data field carrying frame data and frame alteration field to carry commands to alter the frame.

* * * * *